Dec. 5, 1950  J. E. HARVEY  2,532,300
FOCUSING OBJECTIVE

Filed Sept. 24, 1947  2 Sheets-Sheet 1

INVENTOR.
James E. Harvey
BY
Strauch & Hoffman
Attorneys

Dec. 5, 1950     J. E. HARVEY     2,532,300
FOCUSING OBJECTIVE
Filed Sept. 24, 1947     2 Sheets-Sheet 2
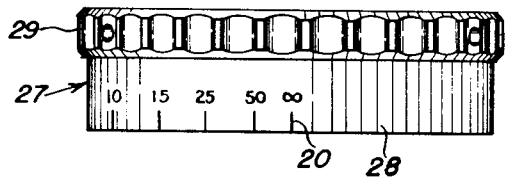
Fig. 3
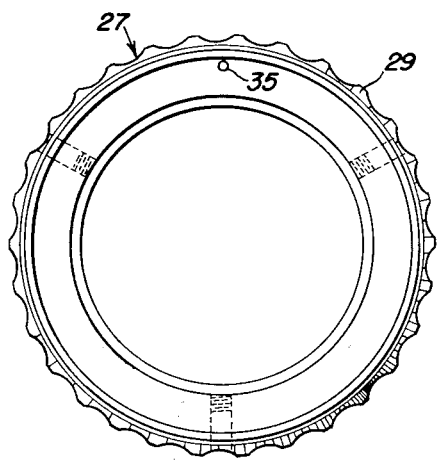
Fig. 4
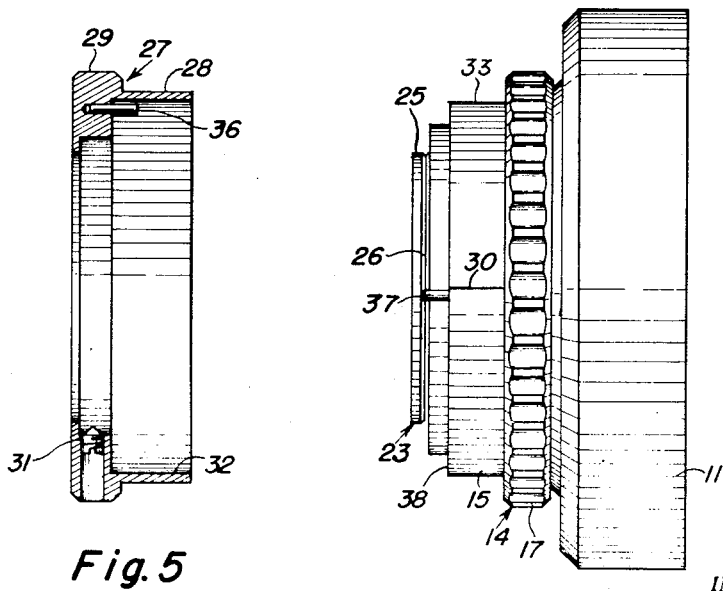
Fig. 5
Fig. 6
INVENTOR.
James E. Harvey
BY
Strauch & Hoffman
Attorneys Patented Dec. 5, 1950

2,532,300

UNITED STATES PATENT OFFICE 2,532,300

FOCUSING OBJECTIVE

James E. Harvey, Ann Arbor, Mich., assignor to Argus, Incorporated, Ann Arbor, Mich., a corporation of Michigan Application September 24, 1947, Serial No. 775,786

4 Claims. (Cl. 88—57)

This invention relates to cameras and particularly to mechanism for focusing adjustment of the objective lens assembly.

This invention has for its primary object the provision of a novel adjustable lens mount construction whereby the objective lens assembly of the camera may be accurately adjusted between limits of focus defined by positive stops.

It is a further object of the invention to provide a novel combination lock ring and focus stop in an adjustable lens mount assembly for a camera objective.

Further objects of the invention will presently appear as the description proceeds in connection with the appended claims and the annexed drawings wherein:

Figure 3 is a top plan view of the focus adjusting ring of the lens mount of Figure 1;

Figure 4 is a rear end elevation of the focus adjustment ring of Figure 3;

Figure 5 is an axial sectional view of the focus adjustment ring of Figure 3, particularly illustrating the stop pin for the infinity position; and Figure 6 is an elevation of part of the lens mount of Figure 1 with the focus ring and other parts removed.

Figure 1:
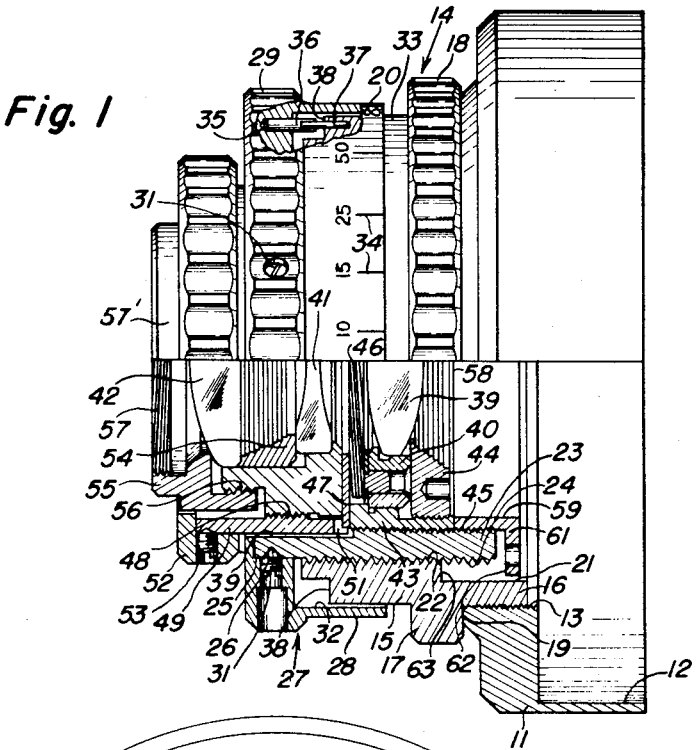
Figure 1 is a side elevation of a lens mount of the invention with the lower half in axial section to illustrate the focusing adjustment for the objective lens assembly.
Figure 2:
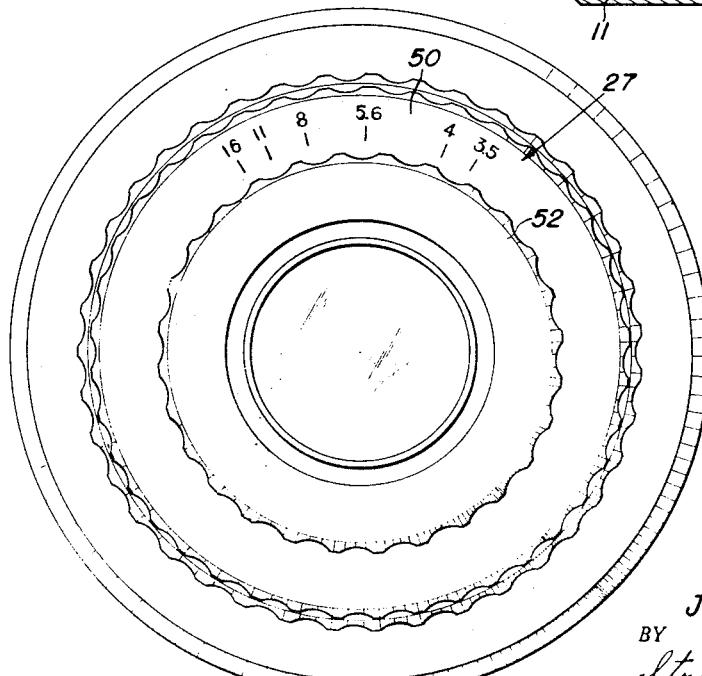
Figure 2 is a front elevation of the lens mount of Figure 1.

Referring to Figure 1, the lens assembly is mounted on the camera by an annular support 11 which at its rear end is formed with a cylindrical bore 12 adapted to be fitted over and secured to a coacting boss projecting from the front of the camera. Support 11 is formed with an internal threaded bore 13 which is of smaller diameter than bore 12 and in which an annular nut 14 is threaded for removably mounting the lens assembly in the camera. Nut 14 comprises a forwardly extending boss 15, an externally threaded shoulder 16 at its rear end within bore 13, and an intermediate enlarged integral radial flange 17 formed with external knurling 18. Nut 14 carries the entire lens mount assembly and during assembly is rotated with the threads of shoulder 16 and bore 13 in engagement until rear face 19 of flange 17 engages the front surface of support 11, whereby nut 14 is rigidly attached to support 11.

Nut 14 is formed with an internal cylindrical bore 21 opening to its rear, and forwardly with a smaller threaded bore 22 and it is in this threaded bore 22 that the entire lens mount assembly is mounted for unit adjustment for focusing the objective with respect to the plane of the film in the camera. A sleeve 23 is externally threaded at 24 for rotatably mounting sleeve 23 on nut 14. At its forward end, sleeve 23 is provided with a narrow cylindrical peripheral surface 25, where the threads 24 are relieved and a V-shaped annular groove 26 is formed in surface 25.

A focusing ring 27 which comprises a cylindrical barrel 28 and a radial flange 29 is rigidly secured in a selected angular position on sleeve 23, as a plurality of set screws 31 that extend through suitable threaded apertures in flange 29 with their outer ends disposed below the knurled surface of flange 29 so as not to interfere with the fingers of an operator turning the focusing ring. The inner ends of the set screws seat in groove 26 which, being continuous, permits focusing ring 27 to be locked by set screws 31 in any desired angular position on sleeve 23.

As illustrated best in Figure 1, the internal cylindrical surface 32 of barrel 28 of the focusing ring extends in telescoping relation over the cylindrical peripheral surface 33 of stationary nut 14. The external surface of barrel 28 formed with a series of indicia marks 34 calibrated in feet. A suitable index line 30 is provided on surface 33 substantially in vertical axial plane of Figure 1.

It will be seen therefore that by rotating the focusing ring 27 by manipulation of flange 29, sleeve 23 will be both rotated and shifted axially, the axial shifting of the sleeve accomplishing a focusing operation of the lens assembly which is mounted on the sleeve as will hereinafter be described. The scale at 34 coacts with index 30 to serve as the focus adjustment indicator to the operator of the camera.

Internally, focusing ring 27 is provided with an aperture 35 which, as illustrated in Figures 3 and 4, is in radial alignment with the infinity mark 20 of the scale mark on surface 28. A suitable pin 36, having force fit in aperture 35, projects within bore 32 parallel to the axis of rotation of focusing ring 27. Pin 36 is a stop member that coacts with the side of a similar and parallel stop pin 37 which projects axially from radial face 38 formed by a shoulder in the outer end of nut 14. The coextensive lengths of pins 36 and 37 are such that, when focusing ring 27 has been rotated until the objective is in the infinity focus or innermost position with respect to the plane of the film in the camera, the pins 36 and 37 are in lateral engagement to stop further rotation of the focusing ring in one direction. As illustrated in Figure 6 pin 37 is circumferentially displaced with respect to index 30 so that infinity mark 20 will align with index 30 when pins 36 and 37 contact. Therefore, when focusing ring 27 is turned to its limit of rotation in one direction as determined by the pin 36 and 37, the lens assembly on sleeve 23 is in infinity focus position. Since threads 22 and 24 are preferably right-handed, this is the innermost position of the lens assembly carried by collar 23.

The lens assembly carried by sleeve 23 comprises three fixedly spaced lens elements 39, 41, and 42. Rear lens element 39 is seated in ring 40 on annular lens mount 43 and held in place by a retaining ring 44. Lens mount 43 is externally threaded for securing it within the internal threaded rear bore of sleeve 23. A suitable iris diaphragm assembly 46 carried by lens mount 43 is coaxial with the lens assembly and has a rotatable control ring lever extension 47 projecting through a suitable slot in lens mount 43.

Forwardly of diaphragm 46, lens mount 43 is formed with an external threaded portion 48 for rotatably and axially adjustably mounting a diaphragm control sleeve 49 that has an inner end slot 51 embracing lever 47. A knurled collar 52 is secured to the outer end of sleeve 49 as by set screw 53, and when sleeve 49 is rotated about the axis of the lens assembly diaphragm 46 is opened or closed. The radial front face of ring 27 carries a scale 50 indicating iris diaphragm openings, and this scale coacts with a suitable index on the periphery of collar 52.

The center lens element 41 is clamped between a seat in lens mount 43 and a spacer ring 54, and front lens element 42 is clamped between spacer ring 54 and a lens retainer ring 55 which is secured in threaded engagement with lens mount 43 at 56. Retainer ring 55 is formed with an internal thread 57 for mounting a filter or the like, and with an external surface 57' for a slip-on type filter or other accessory.

As illustrated in Figure 1, the rear face 58 of lens mount 43 which is normal to the axis of the lens assembly is disposed well inwardly of bore 45, and a locking ring 59 is mounted in the outer end of bore 45 in abutment with face 58 for locking mount 43 to sleeve 23.

Ring 59 is formed with an integral radial flange 61 that projects into bore 21, and its front face 62 is parallel to a face 63 at the bottom of bore 21. Faces 62 and 63 are planar and normal to the lens assembly axis, and they serve as stop faces to define the outermost position of the lens assembly which is when the camera is focused for three feet. When faces 62 and 63 contact, the three foot indication on scale 34 is opposite index 30.

In mounting the lens assembly on the camera, the annular lens mount member 43 is positioned and locked in a selected axial position on collar 23 by lock ring 59. Sleeve 23 is then rotatably mounted in bore 22 and stopped with the lens assembly at the position calculated for infinity focus. Then, with set screws 31 loose, focusing ring 27 is rotated with respect to lens mount 43 until the pins 36 and 37 abut, which also means that infinity mark 20 is now aligned with index 30. Set screws 31 are then tightened and scale 34 is now correlated with the focus stops.

The axial distance between faces 62 and 63, which is the distance the lens assembly must be shifted between infinity and three foot focus positions, may be accurately calculated and scale 34 is calibrated to it and the thread size at 22. This distance may be varied by changing the location of either face 62 or 63.

In rotating focusing ring 27 between the inner and outer stop positions of the lens mount 41, ring 27 turns less than one revolution so that speedy focusing is obtained.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a lens mount assembly, a support having a threaded bore, a lens mount member rotatably threaded in said bore for axial focusing adjustment, a focusing ring releasably secured to said member and adapted to be secured thereto in any angular relation therewith, a barrel on said ring extending over a portion of said support, oppositely extending axial stop projections on said support and ring housed mainly by said barrel, engagement of said projections limiting axial displacement of said member in one direction, and coacting scale and index markings on said ring and support correlated with the relative positions of said projections.

2. In a lens mount assembly, a support having a threaded bore, a lens carrying member mounted for rotation and axial displacement in said bore, said member projecting at opposite ends from said threaded bore, a ring secured on the forward end of said member having a barrel extending rearwardly over a corresponding surface of said support, said barrel and support surface being marked with coacting focus indicia, internal stops fixed on said ring and said support respectively adapted to engage during rotation and rearward displacement of said member to stop said member at infinity focus position, and an annular flat stop face perpendicular to the lens axis on the inner end of said member adapted to engage a similar rearwardly facing stop face on said support during rotation and forward displacement of said member at a predetermined shorter focus position.

3. In the lens mount assembly defined in claim 2, a removable lens mount locking ring on said member having a flange on which said first mentioned annular stop face is formed.

4. In the lens mount assembly defined in claim 2, said ring being separable and capable of being adjustably locked in any position of relative rotation on said member.

JAMES E. HARVEY.

REFERENCES CITED

The following references are of record in the file of this patent:

UNITED STATES PATENTS

| Number | Name | Date |
|---|---|---|
| 1,076,694 | Oliver | Oct. 28, 1913 |
| 1,405,463 | Tessier | Feb. 7, 1922 |
| 1,835,503 | Lemke | Dec. 8, 1931 |
| 1,848,402 | Wollensak | Mar. 8, 1932 |
| 2,006,464 | Laube et al. | July 2, 1935 |
| 2,126,300 | Wittel | Aug. 9, 1938 |
| 2,186,616 | Mihalyi | Jan. 9, 1940 |
| 2,279,476 | Mihalyi | Apr. 14, 1942 |
| 2,293,592 | Cisski | Aug. 18, 1942 |
| 2,315,977 | Mihalyi | Apr. 6, 1943 |